United States Patent [19]

Kakita

[11] Patent Number: 5,014,079
[45] Date of Patent: May 7, 1991

[54] CAMERA

[75] Inventors: Tsuyoshi Kakita; Yasushi Hoshino; Hirokazu Higuchi; Yasutsugu Nakagawa; Tohru Horiuchi, all of Hachioji, Japan

[73] Assignee: Konica Corporation, Shinjuku, Japan

[21] Appl. No.: 454,907

[22] Filed: Dec. 22, 1989

[51] Int. Cl.$^5$ ............................................. G03B 17/40
[52] U.S. Cl. .................................................. 354/266
[58] Field of Search ...................... 354/266, 267.1, 269, 354/81, 94, 99, 293, 467

[56] References Cited

U.S. PATENT DOCUMENTS 4,290,685 9/1981 Ban ........................................ 354/266
4,389,109 6/1983 Taniguchi et al. ............. 354/467 X Primary Examiner—L. T. Hix
Assistant Examiner—Jae N. Noh
Attorney, Agent, or Firm—Finnegan, Henderson, Farabow, Garrett and Dunner

[57] ABSTRACT

A camera includes a sound pressure section, a release determining section, and a shutter driving section. The sound pressure detecting section detects the sound pressure level of an input sound. The release determining section outputs a release signal when the sound pressure level detected by the sound pressure detecting section in a reference value of more for a predetermined period of time. The shutter driving section performs a release operation in response to the release signal from the release determining section.

5 Claims, 11 Drawing Sheets

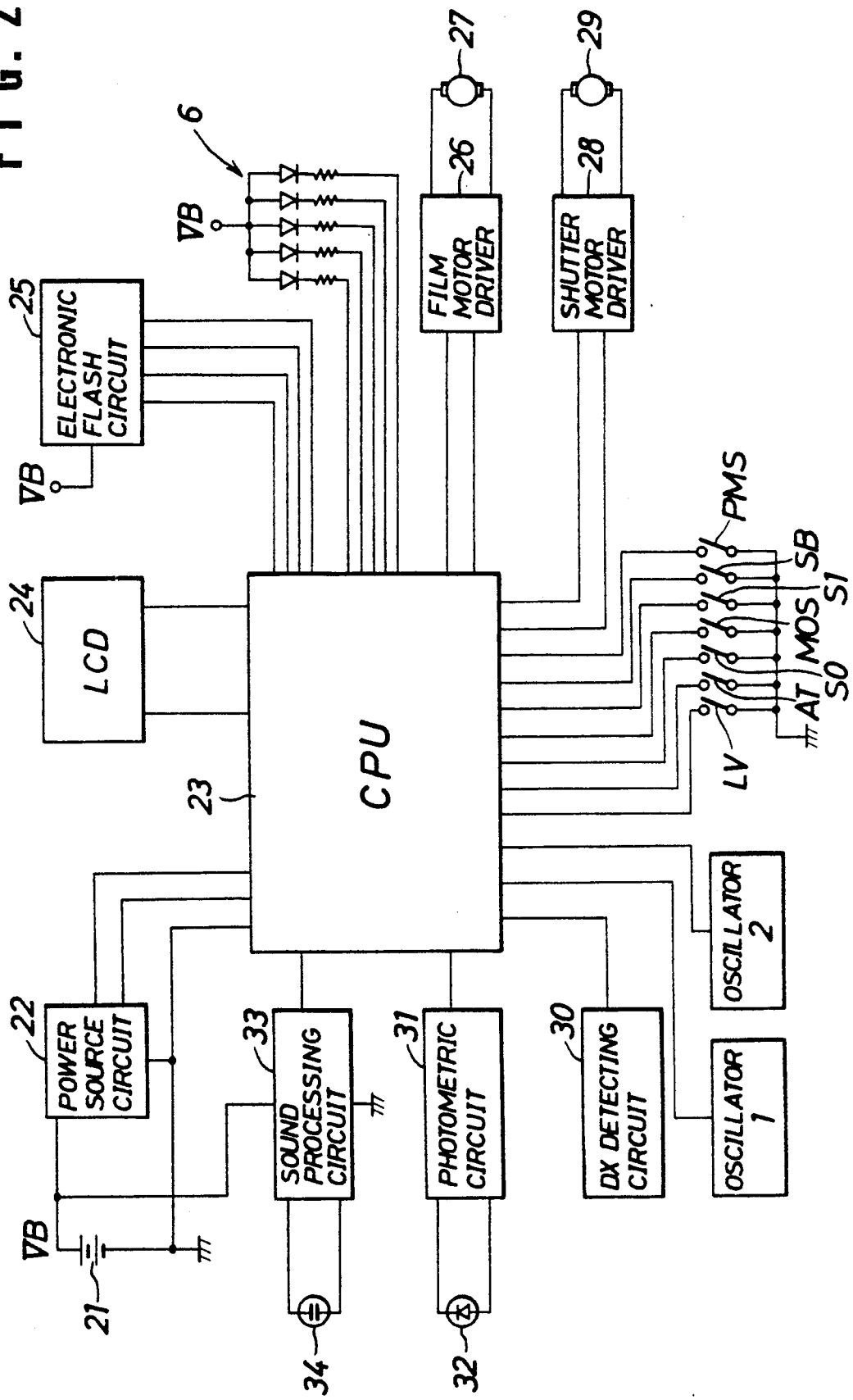

F I G. 17
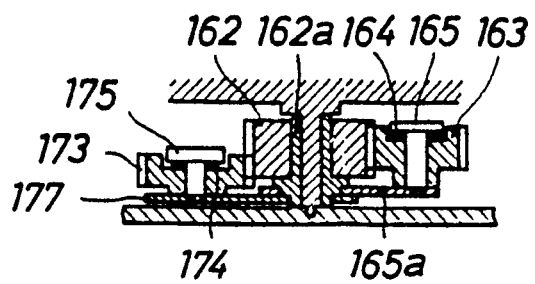
F I G. 18
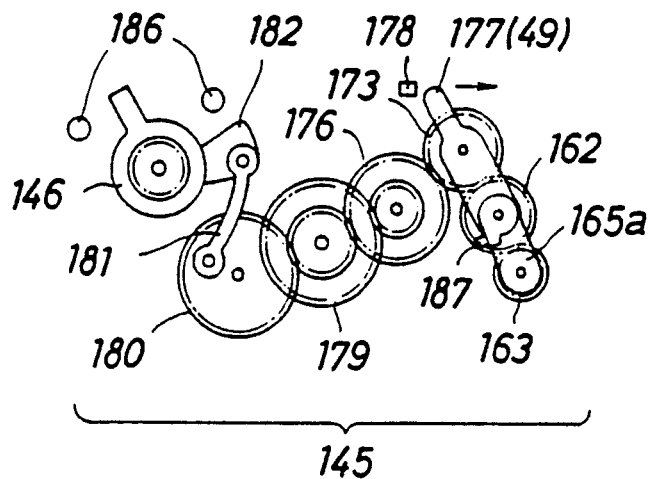
F I G. 19
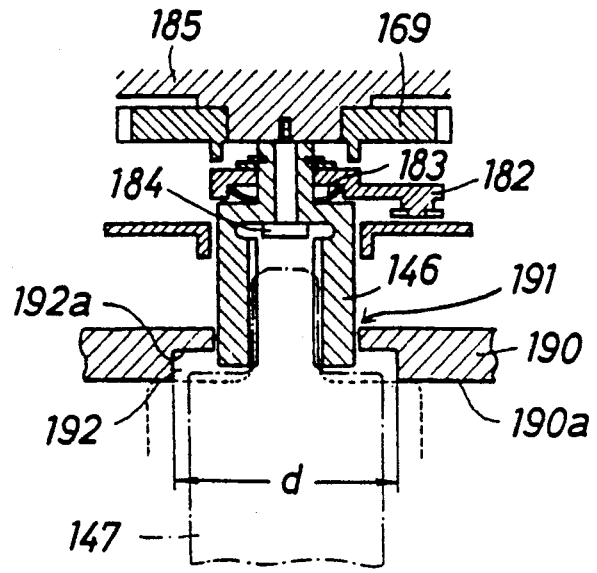

CAMERA

BACKGROUND OF THE INVENTION

The present invention relates to a camera for automatically performing a release operation in accordance with the sound pressure level of every input sound to the camera, including a voice, laughter, a clap, and other sounds.

There are a lot of occasions where photographs are taken as in banquets and parties It is not so easy for a person serving as a photographer to take photographs during a banquet, and besides, the photographer cannot have his/her photographs taken during photography. Therefore, it is a great convenience to have a camera which can automatically determine a shutter chance and perform a release operation.

If such a camera is available, all the participants including a person serving as a photographer can enjoy a banquet or a party. Such a type of camera has not been developed yet.

If the shutter is released at a jovial moment in a banquet or a party by using such a camera, a good photograph can be taken. Therefore, a camera may be designed to perform a release operation upon detection of, e.g., laughter, a cheer, a clap, and applause at a jovial moment in a banquet. Since a known conventional speech recognition camera can respond to only a specific speech, it cannot detect such sounds as described above which are generated at a jovial moment. Consequently, the conventional camera cannot automatically perform a release operation upon detection of such sounds.

According to another conventional camera which has been proposed, when the magnitude of an input sound exceeds a predetermined reference level, a release operation is performed by using the input sound as a trigger signal. Such a camera, however, releases the shutter in response to, e.g., a sound generated when a door is shut, a cough, and a sneeze. Therefore, such a camera cannot properly determine shutter chances, and takes a lot of wasteful photographs.

Even if a camera which is designed to automatically perform a release operation is used, a user is still required to perform framing. If photography is continuously performed with the same framing while the camera is placed on a tripod or a table, several tens of photographs having the same composition are taken. In the middle of a banquet or a party, a user tends to forget to change the framing, and besides, such an operation is a nuisance to the user. If such a change in framing can be automatically performed, it will provide a great convenience. However, any proposal for such automatic framing has not been offered yet.

Such a problem is posed not only in the above-described automatic release camera but also in other cameras such as cameras for performing a release operation by means of a remote controller and cameras for controlling a release operation by using various types of sensors (infrared sensors, temperature sensors, and the like).

It is a principal object of the present invention to provide a camera for automatically performing a release operation at a banquet or a party.

It is another object of the present invention to provide a camera which can automatically change a framing.

SUMMARY OF THE INVENTION

In order to achieve the first object, according to the present invention, there is provided a camera wherein the sound pressure of an input sound is detected, and a release operation is performed when the detected sound pressure keeps exceeding a reference value for a predetermined period of time.

In order to achieve the second object, according to the present invention, there is provided a camera comprising mounting means for mounting the camera on support means, changing means for changing the direction of a body of the camera by a predetermined amount with respect to the mounting means, and control means for inhibiting an operation of the changing means during an exposure operation of the camera.

BRIEF DESCRIPTION OF THE DRAWINGS

FIG. 2 is block diagram showing a circuit arrangement of the camera in FIG. 1;

FIG. 17 is a sectional view showing a mounting state of a drive gear, a winding planetary gear, and a swingable planetary gear;

FIG. 18 is a plan view showing a swing mechanism seen from the camera bottom side;

FIG. 19 is a sectional view showing a tripod mounting portion; and

DETAILED DESCRIPTION OF THE PREFERRED EMBODIMENT

The present invention will be described below with reference to the accompanying drawings.

Figure 1:
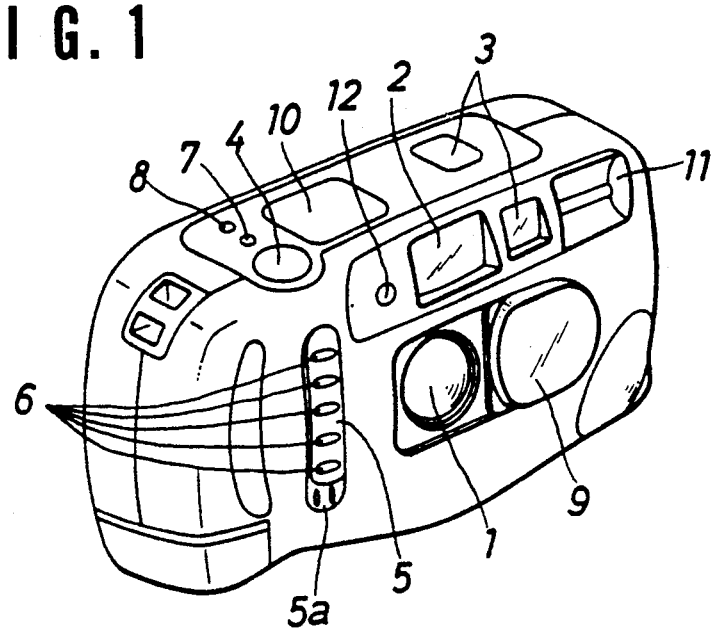
FIG. 1 is a perspective view showing a camera according to an embodiment of the present invention.

FIG. 1 is a perspective view showing a camera according to an embodiment of the present invention. In this case, an automatic film feed type fixed-focus camera is exemplified. However, the present invention is not limited to such a type of camera but can be applied to an AF (automatic focusing) camera and the like.

Referring to FIG. 1, reference numeral 1 denotes a photographing lens; 2, a viewfinder; 3, a framing monitor; 4, a release button; and 5, an automatic release lever for setting an automatic release mode. In the automatic release mode, when a voice, laughter, a clap, or any other input sound continues for a predetermined period of time at a sound pressure level equal to or higher than a reference value, a release operation is automatically performed.

In addition to the automatic release mode for automatically releasing the shutter in accordance with an input sound, this camera has a normal photographic mode in which the shutter is released upon a release operation of a photographer. The automatic release lever 5 is designed to be vertically slidable. If the lever 5 is set at the lower position, the normal photographic mode is set. If the lever is set at the upper position (assumed in FIG. 1), the automatic release mode is set. Note that if the release button 4 is depressed, even in the automatic release mode, a release operation is performed to release the shutter with priority over other operations.

When the automatic release lever 5 is slid upward, microphone holes 5a appear. A sound pressure detecting microphone (identical to a microphone 34 in FIG. 2) is arranged under the microphone holes 5a. Five LEDs 6 for displaying the sound pressures of sounds input from the microphone are attached to a camera body at positions under the automatic release lever 5. That is, the automatic release lever 5 serves not only as an operation member but also as a display member. A user can easily ON/OFF-control the automatic release mode by operating the lever on which a sound pressure level is displayed. These LEDs 6 are arranged to emit green, green, yellow, red, and red light in this order from the lowest position, i.e., emission light approaches the red range toward the uppermost position.

Reference numeral 7 denotes a mode switching button for selecting whether to use a self-timer and selecting a flash mode during the normal photographic mode.

An AT switch (not shown) is used to set a manual or automatic mode. In the manual mode, the user can arbitrarily set a reference sound pressure level at which the shutter is released in the automatic release mode. When the manual mode is set, a reference sound pressure level can be adjusted by using a level setting button 8.

Reference numeral 9 denotes a lens barrier for protecting the photographing lens; 10, a liquid crystal panel for displaying a frame count, a set reference sound pressure level, and other information associated with photography; and 12, a photometric light-receiving lens.

FIG. 2 is a block diagram showing a circuit arrangement of the camera in FIG. 1.

Referring to FIG. 2, reference numeral 21 denotes a battery; 22, a power source circuit for supplying power to each circuit component; and 23, a CPU with a built-in A/D converter for controlling a photographic sequence. The CPU 23 also serves as a release determining means for detecting the sound pressure level of a sound input from the microphone so as to determine whether to allow a release operation. Reference numeral 24 denotes an LCD and its driving circuit used for the liquid crystal display panel 10; 25, an electronic flash circuit for causing an electronic flash 11 to flash; 26, a film motor driver for driving a film feed motor 27; and 28, a shutter motor driver for driving a shutter driving motor 29.

Switches will be described below. Reference symbol PMS denotes a switch which is turned on to set the automatic release mode when the automatic release lever 5 is slid upward; SB, a switch which is turned on when a rear cover is opened; S1, a switch which is turned on when the release button 4 is depressed; MOS, a switch which is turned on when the mode switching button 7 is depressed; SO, a switch which is turned on when the lens barrier 9 is opened; AT, a switch for switching the level setting mode as described above; and LV, a switch which is turned on when the level setting button 8 is depressed.

Reference numeral 30 denotes a DX detecting circuit for detecting the ISO sensitivity of a film on the basis of a DX code appended to a film patrone; 31, a photometric circuit for metering the brightness of an object to be photographed upon reception of an output from a light-receiving element 32; and 33, a sound processing circuit for processing an output signal from the microphone 34.

Figure 3:
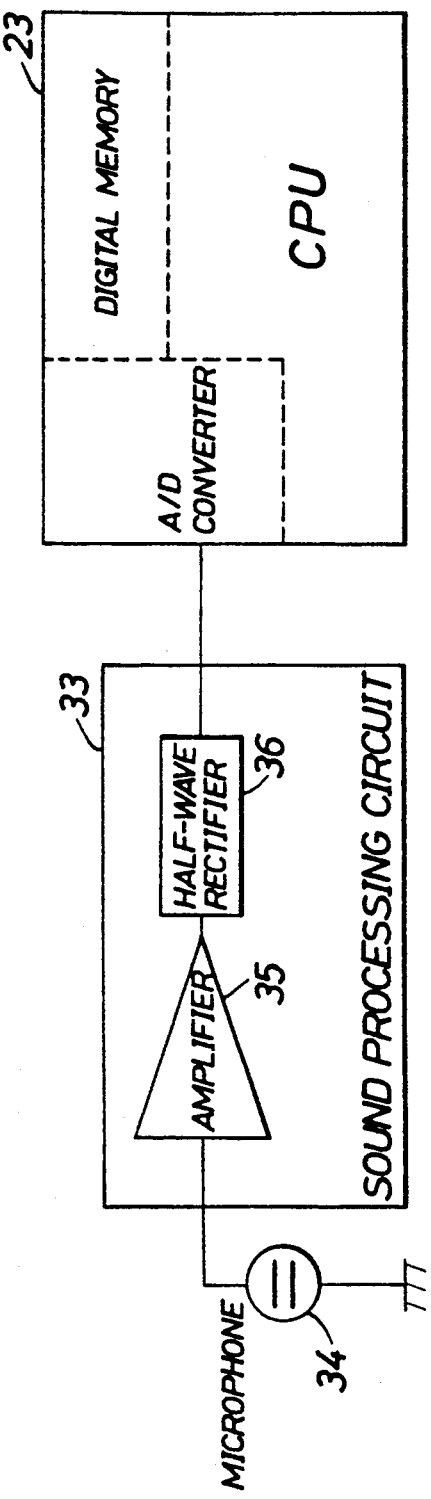
FIGS. 3 and 4 are block and circuit diagrams respectively showing a sound processing circuit in FIG. 2.

As shown in FIG. 3, the sound processing circuit 33 is constituted by an amplifier 35 for amplifying an output signal from the microphone 34, and a half-wave rectifying circuit 36 for converting the amplified signal into a sound pressure signal representing only the magnitude of a sound. The sound pressure signal is output to the A/D converter in the CPU.

Figure 4:
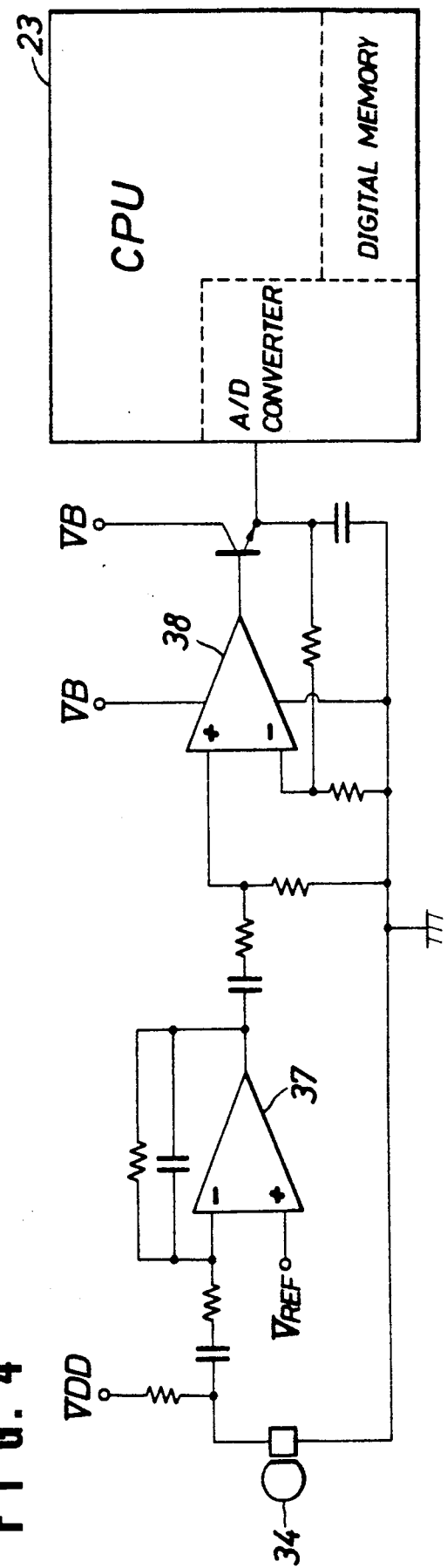

FIG. 4 is a circuit diagram showing a more detailed arrangement of the sound processing circuit 33. A voltage or a current signal from the microphone 34 is amplified by a first operational amplifier 37, and is converted into a sound pressure signal by a second operational amplifier 38. Note that a logarithmic compression circuit (not shown) may be connected to the output terminal of the half-wave rectifying circuit.

In a conventional speech recognition camera, specific speech is frequency-analyzed and registered in advance. Input speech is decomposed into frequency components, and each component is compared with the registered speech (specific speaker recognition). Hence, the conventional camera has a very complex arrangement. The present invention, however, can be realized by a simple arrangement, as shown in FIG. 3.

The principle of release determination of the present invention will be described below.

FIG. 5(a) shows an output waveform from the sound processing circuit 33. If a reference sound pressure level is set to be a level Vref by the level setting button 8, the CPU 23 determines whether an input sound pressure level is higher than the level Vref ((HIGH) is determined) or lower than the level Vref ((LOW) is determined), as shown in FIG. 5(b). Even if (LOW) is determined, the CPU 23 neglects this decision if the input sound pressure level becomes higher than the level Vref (HIGH) after a short lapse of time (e.g., 30 msec), and determines the (HIGH) state has been kept even during the period of (LOW) (this processing will be referred to as "chatter mask" processing hereinafter). FIG. 5(c) shows a waveform obtained by this processing. If the (HIGH) state continues for a predetermined time (e.g., 300 msec) or more, the CPU 23 outputs a release signal to the shutter motor driver 28 to release the shutter.

In this case, the release operation is performed after 300 msec (the duration of sound as a criterion for release determination) has elapsed in order to prevent the camera from responding to an impact sound (normally continues for about 100 msec) such as a sound produced when a beer bottle falls down and a sound produced when a door is shut. This duration of sound is not specifically limited. However, since it is found from the experiments performed by the inventors that an impact sound normally lasts for 50 to 100 msec, the duration of sound is preferably set to be 100 msec or more. If a peak hold circuit is arranged to sample a sound pressure waveform, a detected impact sound signal is distorted, and its width becomes longer than that of the actual impact sound. Furthermore, in consideration of variations in clocks for sampling, the lower limit of the duration is preferably set to be about 200 msec. If, however, a sound pressure waveform can be more accurately sampled by using a method of sampling a sound pressure waveform with a very short period or a like, the lower limit of the duration may be set to be about 100 msec.

The upper limit of the duration is not specifically limited either. If, however, laughter is set as a target, the upper limit of the duration is preferably set to be 500 msec in consideration of the fact that the peak of laughter appears 500 msec after the start of the laughter and that if the duration is set to be too long, a shutter chance may be missed. If the duration is set to be longer than 500 msec, shutter chances tend to be missed.

Figure 6:
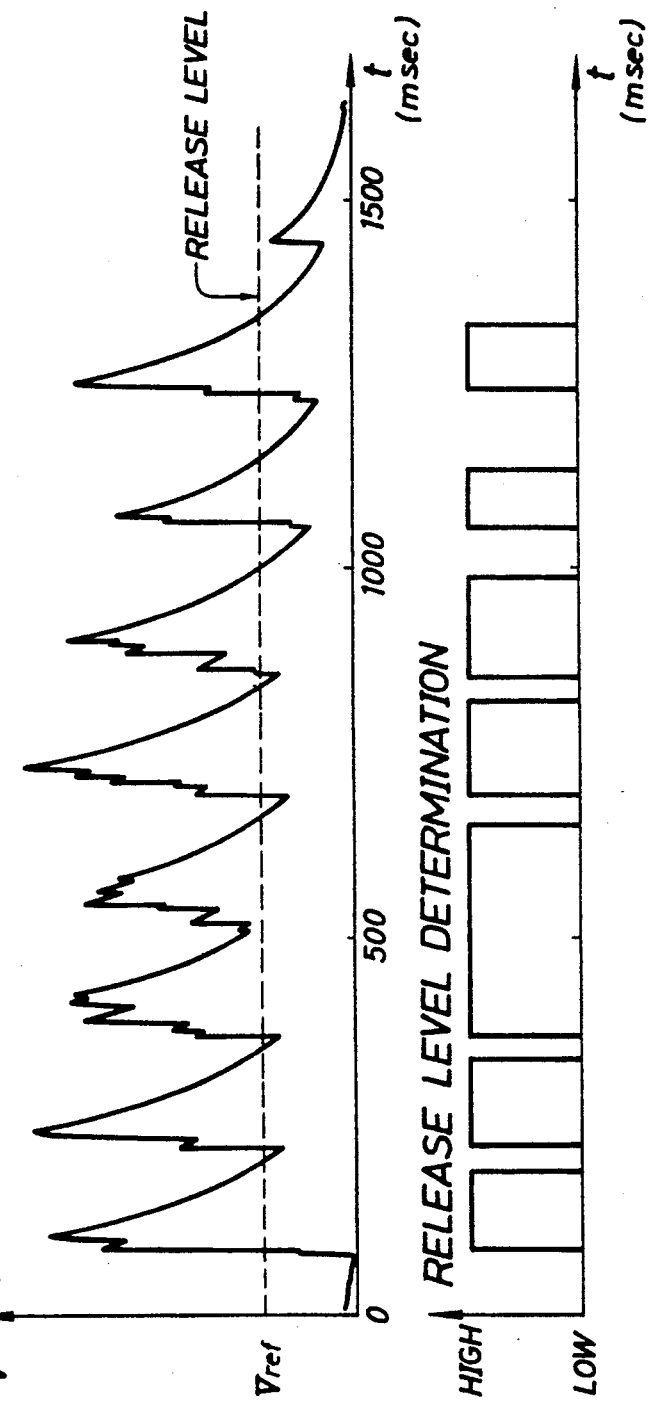

In addition, chatter mask processing is performed to perform a release operation in response to laughter, from which a good photograph can be expected in a banquet or the like, among different sounds at a jovial moment. According to the experiments performed by the inventors, the sound pressure waveform of laughter has a feature that high and low sound pressures repeatedly appear at very short periods, as shown in FIG. 6(b). If such a sound pressure waveform is compared with the reference sound pressure level Vref so as to determine (LOW) and (HIGH), a graph shown in FIG. 6(b) is obtained. If a release operation is to be performed when (HIGH) continues for 300 msec or more on the basis of this comparison result, since a discontinuous waveform is formed depending on a set value of Vref as shown in FIG. 6(b), the condition that (HIGH) continues for 300 msec or more may not be satisfied. Hence, a release operation may not be performed.

Figure 5:
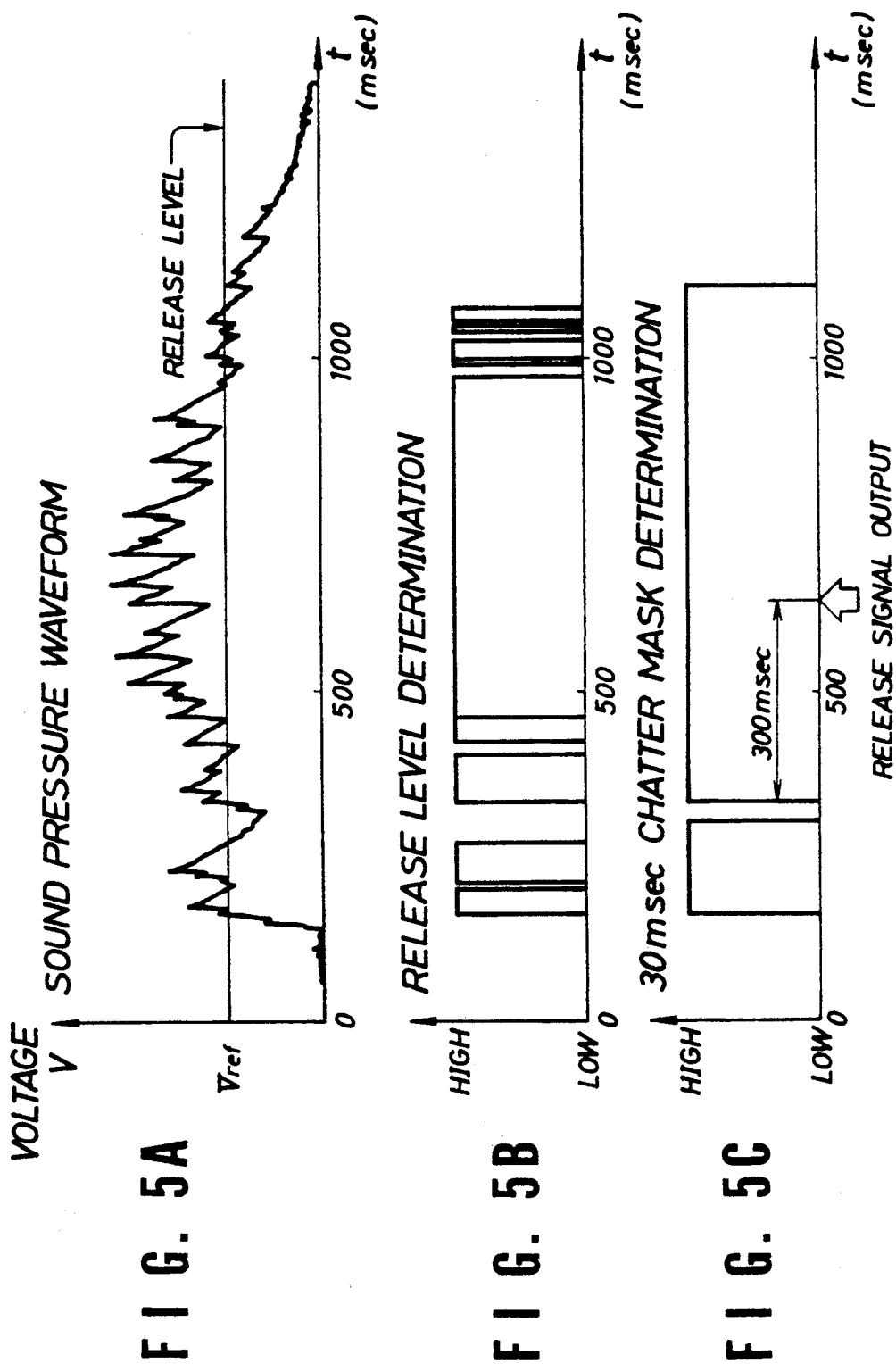
FIGS. 5(a) to 5(c) and 6(a) to 6(c) are graphs for explaining the principle of an automatic release operation.

According to the chatter mask processing described with reference to FIG. 5, if a (HIGH) state appears again a short period of time (e.g., 30 msec) after a (LOW) state, this (LOW) state is neglected, and a corresponding sound is processed on the assumption that the (HIGH) state continued even for this period. When this (HIGH) state continues for a predetermined period of time, a release operation is performed. By performing such chatter mask processing, the shutter can be released even in response to a sound having a specific, discontinuous sound pressure waveform such as laughter. The value of 30 msec is based on an average value of pauses of laughter. However, the present invention is not limited to this value, but another value (e.g., 100 msec) may be set in consideration of other intermittent sounds (a clap and the like).

The reference sound pressure level described above is set to five levels from 70 to 100 phons, i.e., 70, 77, 85, 92, and 100 phons in the order named. These reference sound pressure levels are set with reference to various noise levels described below. Note that the noise levels are obtained by the noise measuring instrument designated by JIS C1502, and the decibel (dB) or phon is used as a unit for measurement. The decibel and the phon are substantially identical. In this case, the levels are represented in units of phons, which is generally used.

| Noise | Level (phon) |
|---|---|
| whisper | 20 |
| quiet rural area | 30 |
| residential urban area | 40-65 |
| in department store | 60-65 |
| normal conversation | 65-70 |
| in crowded train | 75-80 |
| noisy factory | 90 |
| in subway train | 90-95 |
| under girder bridge | 95-105 |
| hurtful to ears | 130 or more |

As is apparent from this table, in the embodiment, the lower limit (70 phons) of the reference sound pressure level substantially corresponds to the sound pressure level of "normal conversation", and the upper limit (100 phons) corresponds to the sound pressure level of "under girdle bridge".

An operation of the embodiment will be described below with reference to flow charts in FIGS. 7 and 8.

Figure 7:
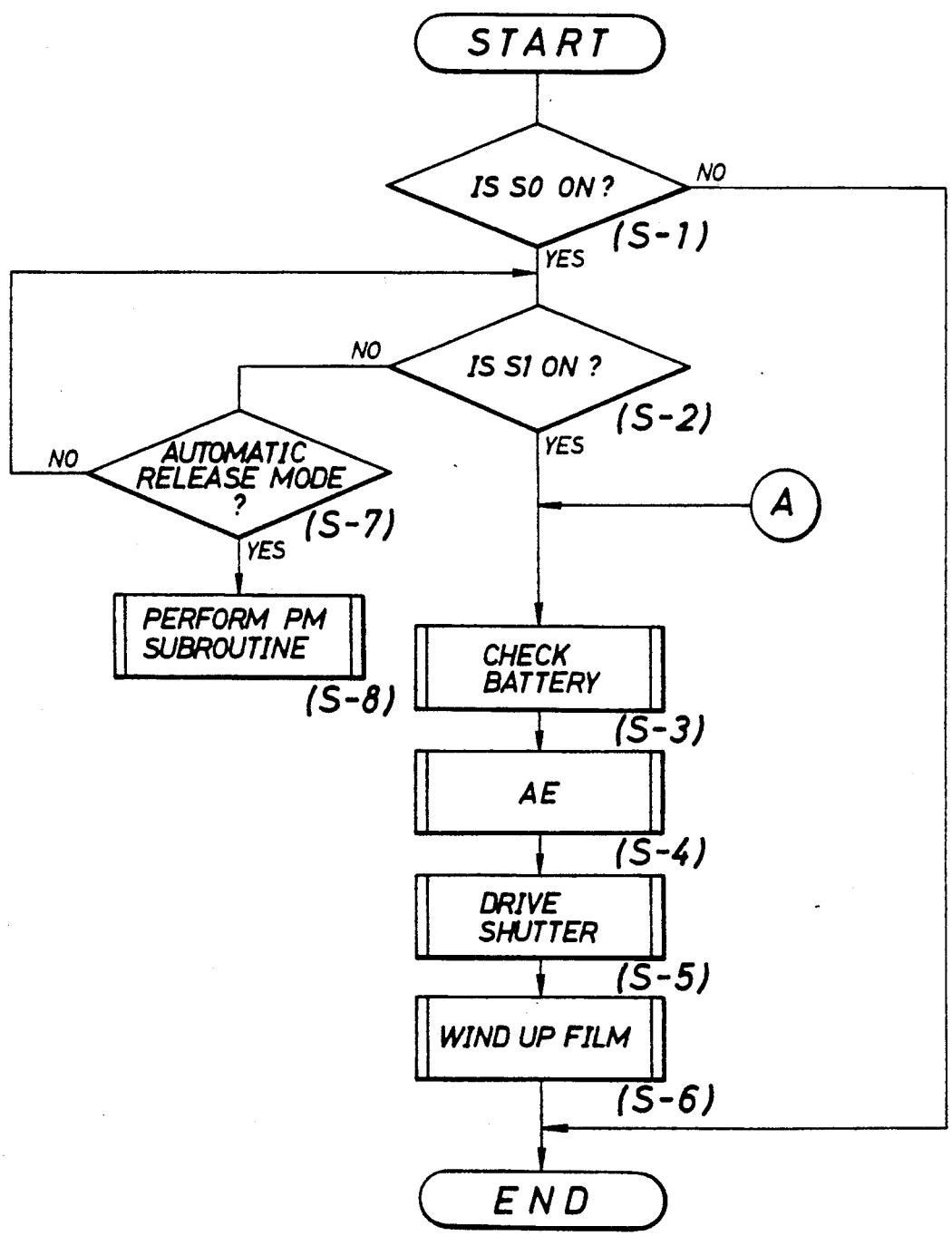
FIG. 7 is a flow chart showing a main routine of a photographic sequence of the camera of the embodiment.

FIG. 7 shows a main routine of a photographic sequence of the camera. It is checked first whether the switch S0 is ON (the lens barrier 9 is open) (step S-1). If the switch S0 is ON, it is then checked whether the switch S1 is ON (the release button 4 is depressed) (step S-2). If the switch S1 is ON, a battery check (step S-3), a photometric operation (step S-4), and shutter driving (step S-5) are sequentially performed to take a photograph. Thereafter, the film is rewound (step S-6).

Since various functions of the camera of the embodiment, such as as automatic loading (automatic film loading), automatic electronic flash charging, automatic DX code reading, and date recording functions, are not relevant to the gist of the present invention, their routines are omitted from the flow chart in FIG. 7.

If NO in step S-2, it is checked from the state of the switch PMS whether the automatic release mode is set (step S-7). If YES in step S-7, a PM subroutine is executed (step S-8).

Figure 8:
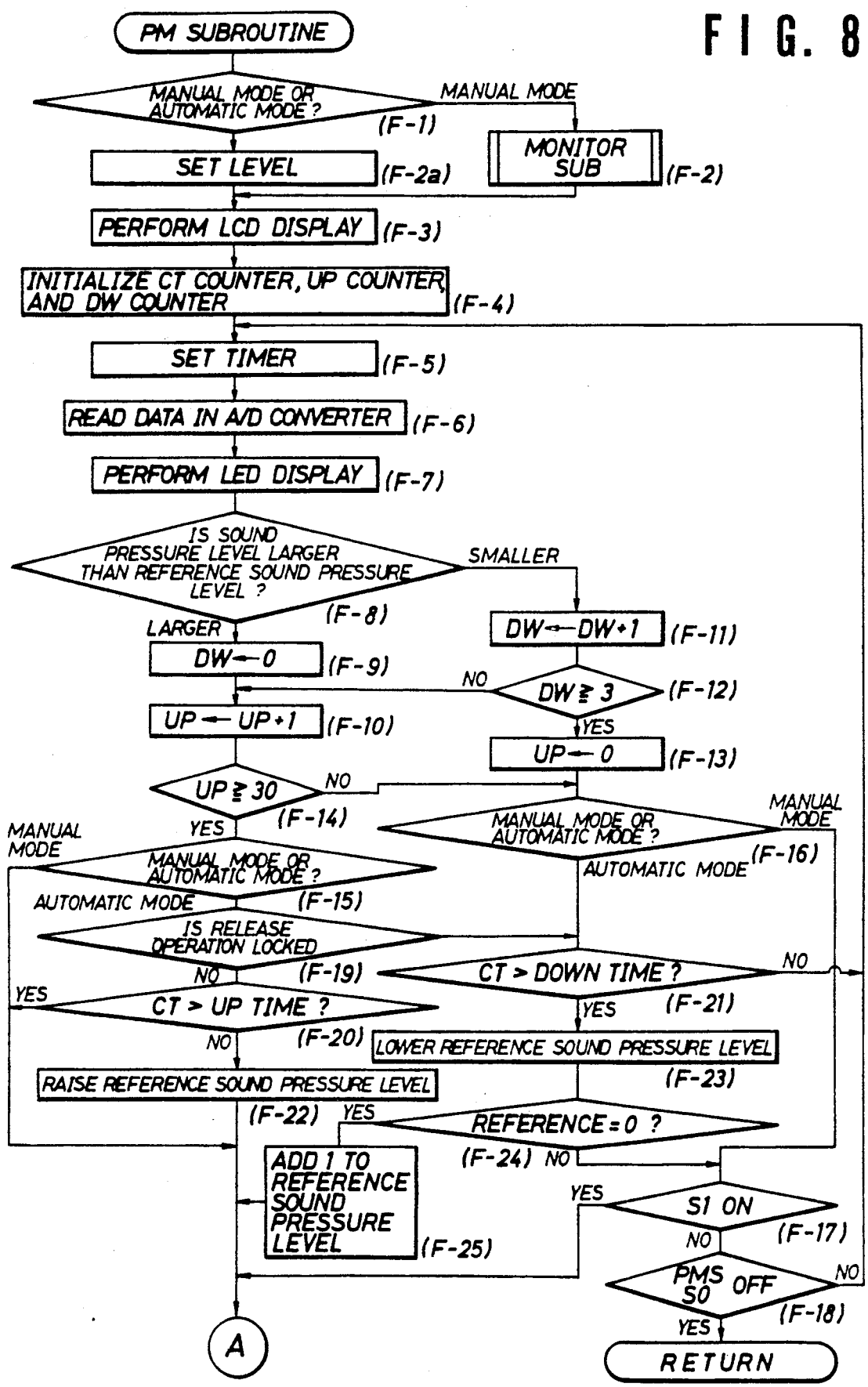
FIG. 8 is a flow chart showing a PM subroutine for controlling an automatic release operation.

FIG. 8 shows the flow chart of the PM subroutine.

The level setting mode is checked on the basis of the state of the switch AT (step F-1). If the manual mode is determined, the flow shifts to a monitor subroutine (step F-2). In this subroutine, a reference sound pressure level is set in accordance with an operation of the level setting button 8. If the automatic mode is determined, a predetermined reference sound pressure level (e.g., the intermediate level) is automatically set (step F-2a). An LCD display is performed on the liquid crystal display panel 10 in accordance with each mode (step F-3).

Subsequently, CT, UP, and DW counters are initialized (step F-4). The CT counter is used to measure a time from a release operation. The UP counter is a counter to be incremented when a detected sound pressure level is higher than the reference sound pressure level. The DW counter is incremented when a detected sound pressure level is lower than the reference sound pressure level.

A 10-msec timer for performing sound pressure determination once every 10 msec is set (step F-5), reading of a detected sound pressure level is started (step F-6), and the read sound pressure level is displayed on the LED 6 (step F-7).

The sound pressure level is then compared with the reference sound pressure level (step F-8). If it is higher than the reference sound pressure level, the DW counter is cleared (step F-9), and the UP counter is incremented (step F-10). In contrast to this, if it is lower than the reference sound pressure level, the DW counter is incremented (step F-11), and it is checked whether the count of the DW counter is three or more (step F-12). If the count is three or more, the UP counter is cleared (step F-13). If the count is less than three, the UP counter is incremented (step F-10). Since the timer is set at 10 msec, a counter value "3" indicates 30 msec (10 msec×3). That is, if a (LOW) state continues for less than 30 msec, a (HIGH) state is continuously determined, thus performing chatter mask processing.

It is checked whether the UP counter is 30 or more (step F-14) so as to determine whether 300 msec (10 msec × 30) has elapsed after the sound pressure becomes higher than the reference sound pressure level. This condition inhibits execution of a release operation in response to a simple impact sound. Note that the duration of sound (300 msec) may be arbitrarily changed by a photographer. If it is determined that the UP counter is 30 or more, and the manual mode is set (step F-15), the flow advances to a shutter sequence to drive the shutter. If it is determined that the upper counter is less than 30, and the manual mode is set (step F-16), the switch S1 is immediately checked (step F-17). If the switch S1 is ON, the flow advances to the shutter sequence to drive the shutter. That is, if the release button is depressed, the shutter is released even in the automatic release mode, as described above. If the switch S1 is not ON, the switches PMS and SO are checked (step F-18). If neither of these switches are not OFF, the flow returns to step F-5. If either of the switches is OFF, the flow returns to the main routine.

Step F-19 and subsequent steps are associated with an operation in the automatic level setting mode. A reference sound pressure level is automatically set through these steps.

If the UP counter value is 30 or more and the automatic level setting mode is set (step F-15), it is checked whether a lock state is present (step F-19). As described above, the reference sound pressure level is changed to five levels from "1" to "5". In step F-19, when the reference sound pressure level is set at the maximum level "5", a lock state is checked from a lock flag set in step F-22. In the lock state, the shutter is not released for one minute after the preceding release operation is performed. This prevents excessively frequent release operations. If no lock state is present, the CT counter value is compared with an UP time (step F-20). If the condition is satisfied, the CT counter value is compared with a DOWN time (step F-21).

The UP and DOWN times are predetermined times for adjusting the frequency of release operations. If a release interval indicated by the CT counter value is the UP time (e.g., 30 seconds) or less, it is determined the frequency of release operations is too high, and the reference sound pressure level is lowered by one level (step F-22) so as to cause the shutter to be less easily released. However, if the condition of a higher level is satisfied while the reference level is at the maximum level "5", a lock flag is set. If a release interval is the DOWN time or more, it is determined that the frequency of release operations is too low, and the reference sound pressure level is raised by one level (step F-23). If the release interval is less than the DOWN time, since the frequency of release operations is not too low, the flow returns to step (F-5) to start a new read operation.

The DOWN time varies depending on a reference sound pressure level, and is set as in the following table.

| Reference sound pressure level | DOWN time |
| --- | --- |
| 1 (70 phons) | 8 min. |
| 2 (77 phons) | 5 min. |
| 3 (85 phons) | 3 min. |
| 4 (92 phons) | 2 min. |
| 5 (100 phons) | 30 sec. |

The reason why the DOWN time is prolonged with a decrease in reference sound pressure level is that if the reference sound pressure level is lowered, the probability of releasing the shutter is increased. Therefore, the DOWN time is prolonged to prevent the reference sound pressure level from being excessively lowered. In the embodiment, the UP time is fixed to 30 seconds. However, the present invention is not limited to this. For example, similar to the manner of setting the DOWN time, the UP time may be prolonged with a decrease in reference sound pressure level, or may be set to be a proper value in accordance with the duration of sound as a criterion (300 msec) for release determination.

If the reference sound pressure level is "1" and the shutter is not released even after 8 min. have elapsed, the level is lowered to "0" (step F-23). In step F-24, it is checked whether the level becomes "0". If YES in step F-24, the level is changed to "1" (step F-25), and the flow advances to the shutter sequence to drive the shutter. That is, in such a case, the shutter is released regardless of the sound pressure level of an input sound. This prevents a state wherein the shutter is not released for too long a period of time. If NO in step F-24, the flow advances to step F-17.

Figure 9:
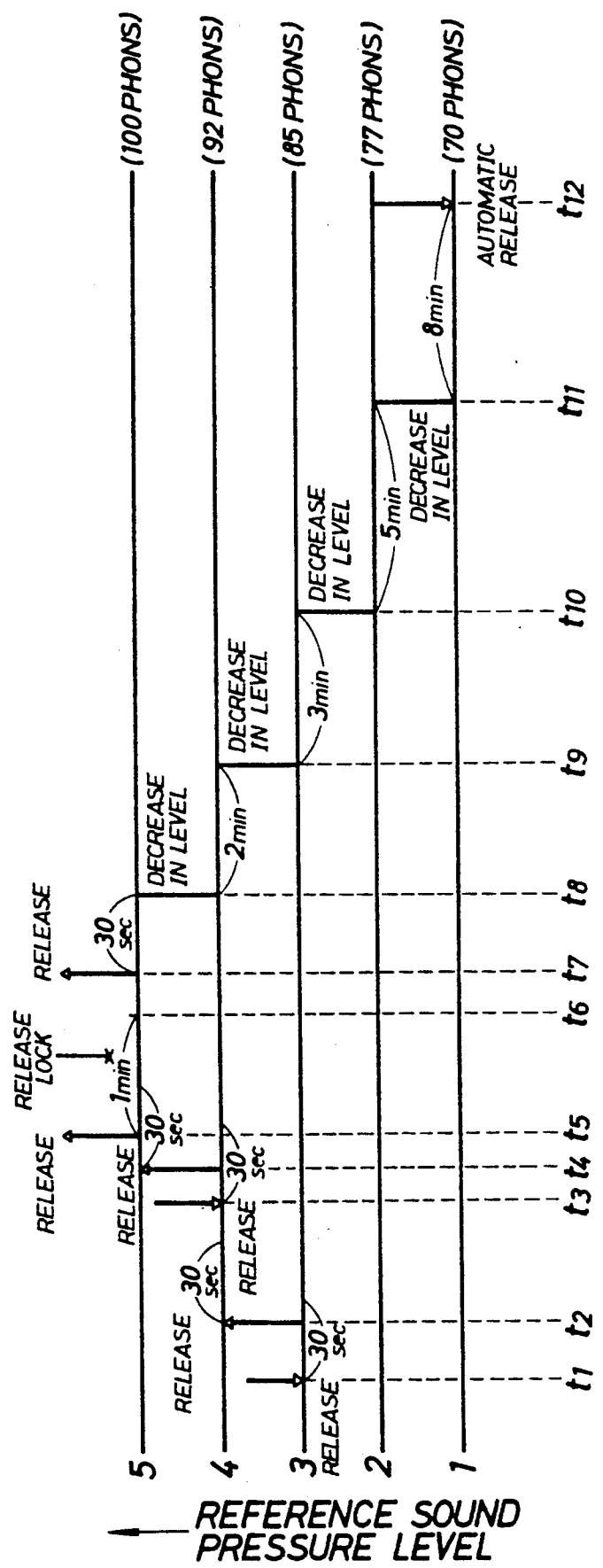
FIG. 9 is a graph for explaining an operation when an automatic level setting mode is set.

FIG. 9 is a graph summarizing an operation of the automatic level setting mode. In FIG. 9, the reference sound pressure level is plotted along the ordinate axis, and the abscissa axis represents time t. The reference sound pressure level is initially set at "3". When the shutter is released at time $t_2$ within 30 seconds from time $t_1$ when the shutter is released, the level is raised to "4". Even if the shutter is released at time $t_3$ within 30 seconds from time $t_2$, the level remains at "4". However, if the shutter is released at time $t_4$ within 30 seconds from time $t_3$, the level further is raised to "5". If the shutter is released again within 30 seconds ($t_5$) from time $t_4$, a release operation is locked for one minute after the release operation, i.e., until time $t_6$. The above-described operation is associated with the case wherein the level is raised.

If the shutter is not released within 30 seconds from a release operation ($t_7$) when the level is set at "5", the level is lowered to "4". If the shutter is not released within two minutes after that time, the level is lowered to "3" ($t_9$). If the shutter is not released within three minutes after that time, the level is lowered to "2" ($t_{10}$). If the shutter is not released within five minutes after that time, the level is lowered to "1" ($t_{11}$). As is apparent, if the shutter is released within each DOWN time, the level is not changed. If the shutter is not released at the level "1" and eight minutes elapse, the shutter is automatically released ($t_{12}$).

If the camera having the above-described arrangement is fixed to a tripod or the like and set at a proper position in a place where a banquet or a party is held, the camera automatically performs a release operation in accordance with a detected sound pressure level, and a user can take photographs without performing any photographic operations. In addition, a release operation is performed during the time participants are in a jovial mood or at a cheerful moment. Therefore, good shutter chances can be taken, which is considered to be difficult even for a professional photographer.

The automatic release mode is usually set for a banquet or a party. Therefore, the camera is preferably designed to emphatically photograph jovial expressions of faces in an in-focus state. In addition, this camera is not very effective for photography of persons located at positions far from the camera from which sounds cannot be received. Hence, it is preferable that the camera is mainly used for short-distance photographic operations. The camera of the embodiment, therefore, is designed such that in the automatic release mode, the photographing lens 1 protrudes to be focused to a short distance upon interlocking with the automatic release lever, thus taking sharp photographs. A structure of this camera will be described below.

Figure 10:
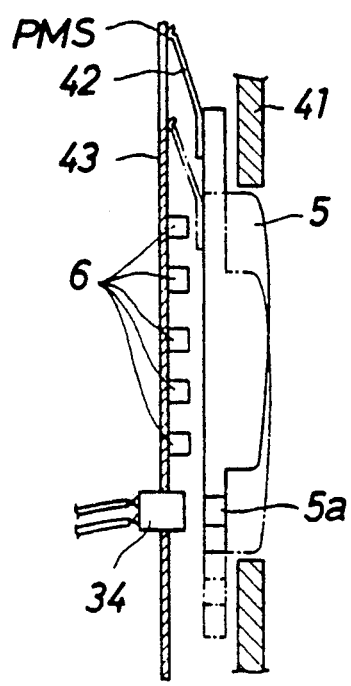
FIG. 10 is a side view showing an automatic release lever.

FIG. 10 is a side view of the automatic release lever 5. The head portion of the lever 5 protrudes from a front cover 41 of the camera. Referring to FIG. 10, a solid line indicates an ON position, and an alternate long and short dashed line indicates an OFF position. When the lever 5 is set at the ON position, a switch contact 42 is slid to turn on the pattern switch PMS formed on a flexible board 43. The lever 5 is constituted by a member which transmits light from the LEDs 6. While the switch PMS is OFF, the microphone holes 5a are covered. When the switch PMS is turned on, the microphone holes 5a are exposed, and external sounds are input to the microphone 34.

Figure 11:
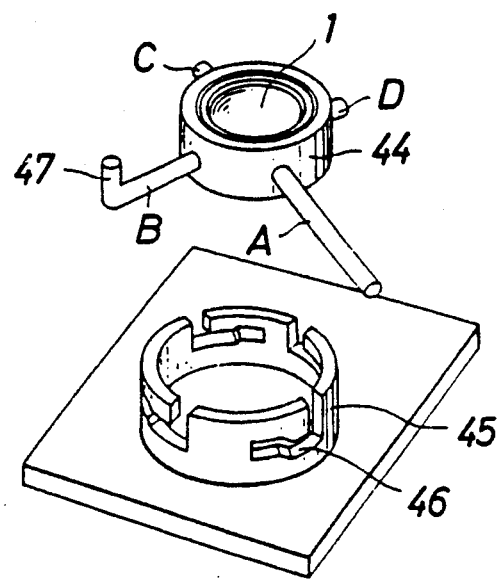
FIGS. 11 and 12 are perspective views showing a mounting structure of a photographing lens.
Figure 12:
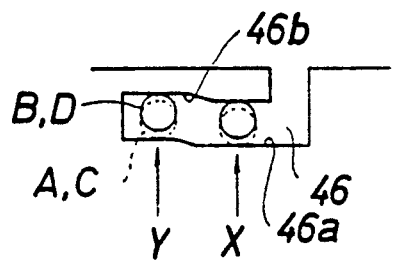

FIG. 11 is a perspective view showing a photographing lens mounting portion. The photographing lens 1 is designed to be threadably engaged with a lens holder 44. In the assembly of the camera, the lens 1 is rotated to adjust its focus and is then fixed. Four cam pins A, B, C, and D are formed on the lens holder 44. These cam pins are respectively engaged with cam grooves 46 formed in a cylindrical portion 45 of a front base plate. Each groove 46 has a step, as shown in FIG. 12.

An upward portion 47 is formed on the distal end of the cam pin B, as shown in FIG. 11. An engaging portion 48 with is engaged with the upright portion 47 is formed in the lever 5, as shown in FIG. 13.

Figure 13:
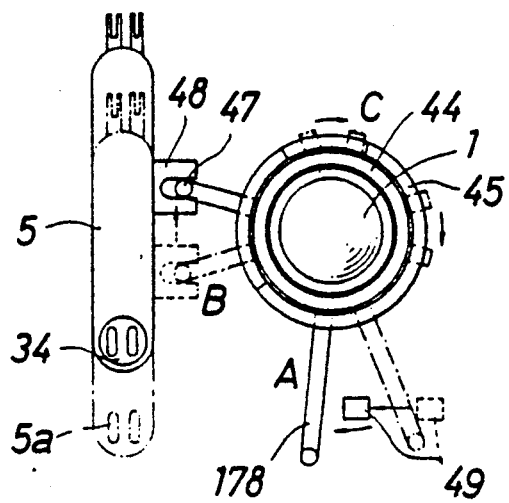
FIG. 13 is a view showing a coupling structure of the automatic release lever and the photographing lens.

If the lever 5 is set at the ON position (automatic release mode), the lens holder 44 is pivoted clockwise in FIG. 13 by the cam pin B and is slightly moved toward an object to be photographed due to the effect of the cam groove 46. That is, the cam pin is at a position denoted by reference symbol X in FIG. 12 while the automatic release mode is not set, and is moved to a position denoted by reference symbol Y when the automatic release mode is set.

In this embodiment, in the normal mode (not in the automatic release mode), the focal position is set to cover a focal length from 1.5 m to infinity with a depth of field. In the automatic release mode, however, the lens is caused to protrude to be focused to a length of 1 to 4 m. This allows the camera to take sharp photographs. As shown in FIG. 12, the cam pins A and C (indicated by dotted lines) move along a lower cam surface 46a of the cam groove, and the cam pins B and D (indicated by solid lines) moved along an upper cam surface 46b. A level difference of about 0.05 mm is defined between both the pairs of cam pins so as to prevent a backlash of the lens holder 44.

As will be described later, in the automatic release mode, the rotational force of the motor during a film winding operation is reduced and transmitted to the camera mounting base of the tripod through a transmission mechanism such as a gear and crank so that the camera, as a whole, is pivoted by a predetermined angle during the film winding operation after a release operation. If this pivotal operation is performed upon every film winding operation, and the camera is pivoted at a predetermined angle, the camera is pivoted in the reverse direction. That is, the camera swings within a predetermined angular range.

As shown in FIG. 13, a switching lever 49 is arranged to switch transmission of the rotational force of the motor in the automatic release mode. While the switching lever 49 is set at a position indicated by a dotted line in FIG. 13, the rotational force of the motor is not transmitted, and hence the swing mechanism of the camera is not actuated. When the switching lever 49 is set at a position indicated by a solid line, the rotational force of the motor is transmitted to actuate the swing mechanism. The switching lever 49 is normally biased toward the position indicated by the solid line. While the lever 5 is set at the OFF position, since a distal end 178 of the cam pin A urges the switching lever 49, the swing mechanism is not actuated. When the lever 5 is set at the ON position, the locked state of the cam pin A is released, and the switching lever is moved to actuate the swing mechanism. With this arrangement, in the automatic release mode, the photographing direction of the camera can be automatically changed, and hence photographs can be taken at various angles.

Figure 14:
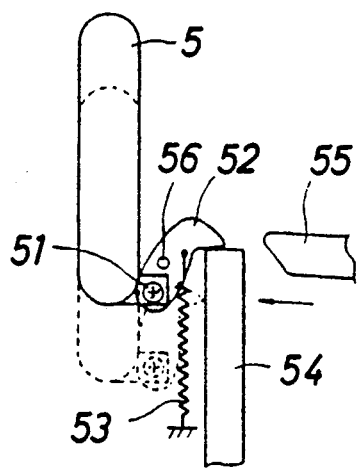
FIG. 14 is a view showing a release mechanism of the automatic release lever using a lens barrier.

Note that when the lens barrier 9 is closed, photography is completed, and hence the automatic release mode should be cancelled. FIG. 14 shows a mechanism for such an operation. A hook 52 which can pivot about a fulcrum 51 is formed on the automatic release lever 5. The hook 52 is biased downward and rightward by a spring 53. In FIG. 14, an alternate long and short dashed line indicates a state wherein the switch is OFF. If the lever 5 is slid upward in this state, the hook 52 is urged rightward by the spring 53 and slid upward so as to slip off from the end of a wall 54 to the right and to be hooked. When the barrier 9 is closed, a lever 55 coupled thereto slides leftward and hits a boss 56 formed on the hook 52 so as to release the hook 52. As a result, the lever 5 is restored to the position in the normal mode by the force of the spring 53. In addition, since the hook 52 is in contact with the wall in an oblique state, if the lever 5 is forcibly slid downward with a hand of a user, the hook 52 is released and restored to the position in the normal mode by the force of the spring 53.

Figure 15:
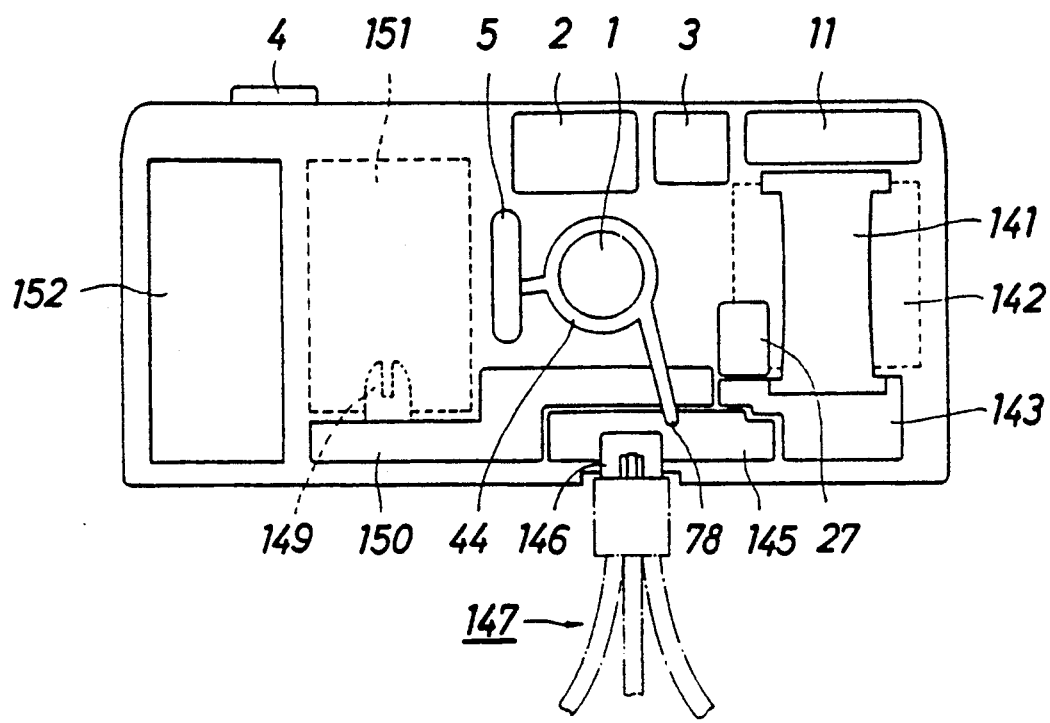
FIG. 15 is a view showing a positional relationship between the respective components.

FIG. 15 shows a positional relationship between the swing mechanism and other components. The same reference numerals in FIG. 15 denote the same parts as in FIG. 1, and a description thereof will be omitted.

Referring to FIG. 15, reference numeral 141 denotes a reel for winding up a film; 142, a reel chamber; 143, a wind-up mechanism for rotating the reel in the wind-up direction by using the rotational force of the motor 27; 145, a swing mechanism to be driven by the motor 27; 146, a tripod screw serving as a mounting portion for mounting the camera on a tripod 147 serving as a camera supporting means; 44, a lens holder for holding the photographing lens 1; 149, a rewinding shaft to be engaged with the winding shaft of a patrone; and 150, a rewinding mechanism which is adapted to rotate the rewinding shaft 149 and is driven by the motor 27; 151, a patrone chamber; and 152, a battery chamber.

Figure 16:
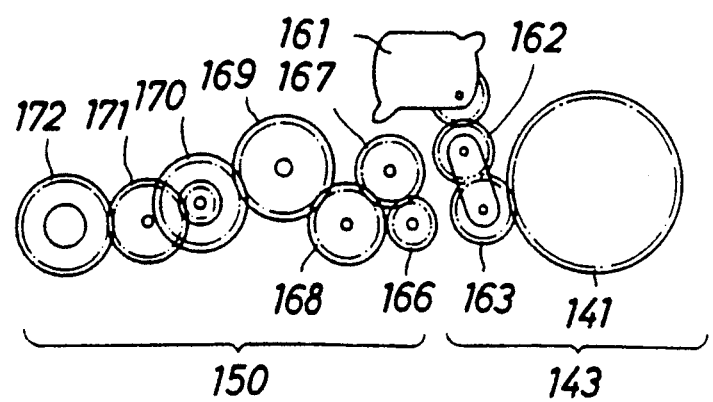
FIG. 16 is a plan view showing winding and rewinding mechanisms seen from the camera bottom side.

FIG. 16 is a plan view showing an arrangement of the wind-up mechanism 143 and the rewinding mechanism 150 seen from the camera bottom side.

Referring to FIG. 16, reference numeral 161 denotes a motor gear unit for reducing the rotational speed of the motor 27. A rotational force reduced by this unit is transmitted to a drive gear 162. The drive gear 162 has an arrangement shown in FIG. 17. A winding planetary gear 163 is friction-coupled to a winding planetary shaft 165 through a friction spring 164. The winding planetary shaft 165 is mounted on a winding planetary lever 165*a* which, in turn, is pivotally mounted on a drive shaft 162*a* as a central shaft of the drive gear 162. When the drive gear 162 is rotated counterclockwise in FIG. 16, the winding planetary gear 163 is brought into contact with the reel 141. As a result, a rotational force acts on the reel 141, and the reel 141 is rotated in the wind-up direction (counter-clockwise).

In contrast to this, if the drive gear 162 is rotated clockwise, the winding planetary gear 163 is pivoted about the drive gear 162 clockwise and is brought into contact with a first rewinding gear 166. As a result, a rotational force is transmitted to the first rewinding gear 166. The first rewinding gear 166 rotates a rewinding shaft gear 172 through a train of rewinding gears 167 to 171. In this manner, the rewinding shaft 149 is rotated clockwise to rewind the film.

FIG. 18 is a plan view showing an arrangement of the swing mechanism 145 seen from the camera bottom side.

The drive gear 162 is meshed with a swingable planetary gear 173 having the same arrangement as that of the winding planetary gear 163. That is, the swingable planetary gear 173 is friction-coupled to a swingable planetary shaft 175 through a friction spring 174 (see FIG. 17). When the drive gear 162 is rotated counterclockwise, the swingable planetary gear 173 is pivoted about the drive gear 162 counterclockwise and is brought into contact with a first swingable gear 176. As a result, a rotational force is transmitted to the gear 176.

The swingable planetary gear 173 is mounted on a swingable planetary lever 177 (the switching lever 49 in FIG. 13). When the swingable planetary lever 177 is moved in a direction indicated by an arrow in FIG. 18 by a switching lever 178 (the cam pin A in FIG. 13), the swingable planetary gear 173 is caused not to be brought into contact with the first swingable gear 176 and not to be swinged. The switching lever 178 is coupled to the lens holder 44. When the automatic release lever 5 is slid downward (set at the OFF position), the lens holder 44 is pivoted counterclockwise by the lever 5. As a result, the switching lever 178 urges the swingable planetary lever 177 to inhibit its swing movement. If the automatic release lever 5 is slid upward (set at the ON position), the inhibit state by the switching lever 178 is cancelled to allow a swing movement of the lever 177.

The first swingable gear 176 has a double-gear structure and transmits a rotational force to a second swingable gear 179 also having a double-gear structure. The force is further reduced and causes a third swingable gear 180 to rotate.

Figure 20:
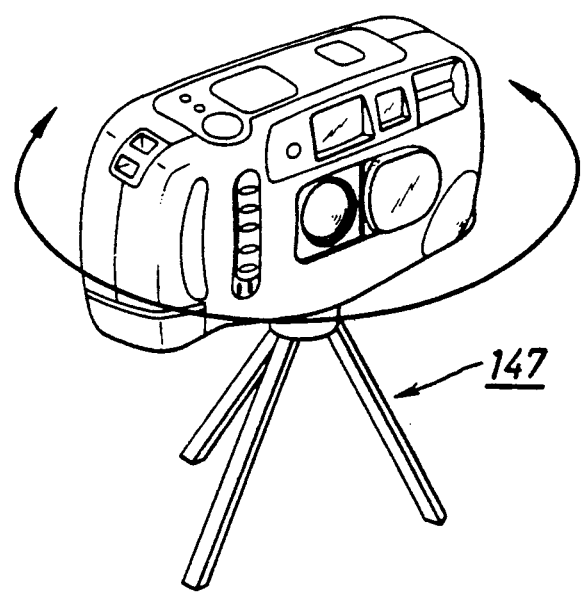
FIG. 20 is a perspective view showing a swing operation of the camera.

The third swingable gear 180, an arm 181, and a swingable lever 182 constitute a crank mechanism. When the third swingable gear 180 is rotated, the swingable lever 182 starts a swing operation. As shown in FIG. 19, the swingable lever 182 is friction-coupled to the tripod screw 146 through a friction spring 183. The tripod screw 146 is rotatably mounted on a camera body 185 with a screw stud 184. Therefore, when the swingable lever 182 is actuated, the tripod screw 146 swings. Since the tripod screw 146 is fixed to the tripod 147, the camera itself will swing within a predetermined rotational angle range, as shown in FIG. 20.

The swingable lever 182 and the tripod screw 146 are friction-coupled to each other in order to prevent a large force from acting on the train of gears when the tripod screw 146 is fastened to the tripod 147. In addition, stoppers 186 are arranged to prevent idling when the tripod screw 146 is mounted on the tripod 147.

When the CPU 23 detects an output from a film feed amount detector (not shown) and detects that the film is wound up by one frame, the motor 27 is stopped. As a result, the pivotal movement of the camera is also stopped. Since the diameter of the reel 141 including the film is increased as the film is wound up, the rotational angle per frame is gradually decreased, and the rotation time of the motor 27 is shortened. Consequently, the swing angle of the camera of one pivotal operation is changed at random in accordance with the crank mechanism constituted by the third swingable gear 180, the arm 181, and the swingable lever 182 and the rotation time of the motor 27. As in the present invention, if a camera is designed to swing by using any one of driving means whose operations are inhibited during an exposure operation, e.g., a film wind-up motor, an AF lens control means, and a focal length changing means for a photographing lens, no specific circuit and mechanism whose operations are electrically and mechanically inhibited during a release operation are required. Similarly, no specific operation start and stop signals for a changing means are required, thus further simplifying the circuit arrangement.

Reference numeral 187 denotes a stopper as a fail-safe mechanism for a failure of the friction mechanism of the swingable lever 182 and the tripod screw 146. This stopper 187 prevents an external force generated upon mounting of the tripod from being transmitted to the rewinding mechanism 150 through the train of gears and changing a film position during photography.

If the friction mechanism fails, an external force generated when the tripod is fastened is directly transmitted to the third swingable gear 180. As a result, the third swingable gear 180 is pivoted clockwise or counterclockwise due to the positional relationship with the arm 181. If the third swingable gear 180 is rotated clockwise, the first swingable gear 176 is also rotated clockwise, and the force is transmitted to the swingable planetary gear 173 so as to rotate the drive gear 162 clockwise. As a result, the winding planetary lever 165*a* pivots about the drive gear 162, and the winding planetary gear 163 tends to move toward the first rewinding gear 166. The pivotal movement of the winding planetary lever 165*a* is stopped by the stopper 187, so that the winding planetary gear 163 is not meshed with the first rewinding gear 166. Therefore, even if the friction mechanism of the swingable lever 182 and the tripod screw 146 fails, this fail-safe mechanism can prevent erroneous rewinding of a film due to an external force generated upon mounting of the tripod. Note that even if the third swingable gear 180 is rotated counterclockwise by an external force, since the first swingable gear 176 is also rotated counterclockwise and the swingable planetary gear 173 is separated from the first swingable gear 176, the external force is not transmitted to the rewinding mechanism 150.

Referring to FIG. 19, reference numeral 190 denotes a bottom cover of the camera. A tripod screw hole 191 is formed in the bottom cover 190, and the tripod screw 146 protrudes out therefrom. A tripod groove 192 having a width d larger than the diameter of the tripod screw hole 191 is formed therearound. The end face of the tripod screw 146 protrudes from a bottom surface 192a of the tripod groove 192 but is located inward from an outer surface 190a of the bottom cover 190.

The tripod 147 is a tripod which is specially designed for a swing operation and has the camera mounting portion whose outer diameter is smaller than the width d of the tripod groove 192. More specifically, since the tripod 147 is threadably engaged with the tripod screw 146 without being brought into contact with the bottom cover 190, the camera is swung by the swingable lever 182. The diameter of the camera mounting portion of the special tripod 147 is smaller than that of a commercially available flexible tripod and is set to be, e.g., about 15 mm.

If a normal tripod, i.e., one having a camera mounting portion whose diameter is larger than the width d of the tripod groove 192, since the bottom cover 190 of the camera is tightly fixed on the tripod as indicated by a dotted line in FIG. 19, the camera does not swing but only the tripod lever 182 swings.

If a camera is designed to swing only when it is mounted on a special tripod, a swing mode and a non-swing mode can be easily and reliably selected by selecting whether to use the special tripod.

The above-described embodiment exemplifies a camera which performs a release operation in response to the sound pressure level of an input sound. However, the present invention is not limited to this but may be applied to a camera which performs a release operation by means of a remote controller, a camera which controls a release operation by using various sensors (infrared and temperature sensors and the like), or a camera which is directly operated by a photographer. In addition, the present invention can be applied to an electronic camera or a video camera which does not use a film based on chemical reactions, by only replacing a film with a recording medium.

In the above-described embodiment, the direction of the camera body is laterally changed. However, the direction may be vertically changed, or a composite movement may be designed by combining vertical and lateral movements.

As has been described above, according to the present invention, since the camera comprises a mounting means for mounting the camera on a supporting means, a changing means for changing the direction of the camera body by a predetermined amount with respect to the mounting means, and a control means for inhibiting an operation of the changing means during an exposure operation of the camera, a framing can be automatically changed. In addition, since, the direction of the camera body is changed after an exposure operation is completed, no blurring of a photographed image occurs.

As will be understood by those familiar with the art, the present invention may be embodied in other specific forms without departing from the spirit or essential characteristics thereof. Accordingly, the disclosure of the preferred embodiments of the present invention is intended to be illustrative, but not limiting, of the scope of the invention which is set forth in the following claims.

What is claimed is:

1. A camera comprising:
   mode setting means for setting an automatic release mode;
   sound pressure detecting means for detecting a sound pressure level of an input sound;
   release determining means for outputting a release signal in accordance with the sound pressure level detected by said sound pressure detecting means in the automatic release mode set by said mode setting means;
   photographing lens protruding means for causing a photographing lens to protrude toward an object to be photographed by a predetermined distance when the automatic release mode is set by said mode setting means; and
   shutter driving means for performing a release operation in response to the release signal from said release determining means.

2. A camera comprising:
   sound pressure detecting means for detecting a sound pressure level of an input sound;
   timer means for measuring a time interval between release operations;
   reference sound pressure level control means for setting a reference sound pressure level to be a predetermined value, raising the reference sound pressure level by a predetermined amount when the time interval between release operations which is detected by said timer means is shorter than a first predetermined time, and lowering the reference sound pressure level by a predetermined amount when a release operation is not performed for longer than a second predetermined time;
   release determining means for outputting a release signal when the sound pressure level detected by said sound pressure detecting means is equal to or higher than the reference sound pressure level set by said reference sound pressure level control means for a third predetermined time; and
   shutter driving means for performing a release operation in response to the release signal from said release determining means.

3. A camera according to claim 2, further comprising inhibiting means for inhibiting a release operation for a fourth predetermined time when the reference sound pressure level, reaches a maximum level.

4. A camera according to claim 3, further comprising means for performing a release operation when the reference sound pressure level is set at a minimum level and a release operation is not performed for longer than a fifth predetermined time.

5. A camera comprising:
   sound pressure detecting means for detecting a sound pressure level of an input sound;
   release determining means for outputting a release signal when the sound pressure level detected by said sound pressure detecting means is equal to or higher than a predetermined value for a predetermined period of time, said release determining means including determining means for determining when the sound pressure level, which is initially equal to or higher than the predetermined value, becomes lower than the predetermined value and subsequently becomes equal to or higher than the predetermined value again within a predetermined period of time, and for determining that a state in which the sound pressure level is equal to or higher than the predetermined value has continued; and shutter driving means for performing a release operation in response to the release signal from said release determining means.

* * * * *